June 3, 1958 L. J. WHITE 2,837,182
KEYLESS LOCKING AND OPERATING SYSTEMS FOR CELL DOORS
Original Filed April 3, 1953 9 Sheets-Sheet 1

INVENTOR
LOYD J. WHITE

BY Adams & Bush
ATTORNEYS

June 3, 1958  L. J. WHITE  2,837,182
KEYLESS LOCKING AND OPERATING SYSTEMS FOR CELL DOORS
Original Filed April 3, 1953.  9 Sheets-Sheet 2

INVENTOR
LOYD J. WHITE

BY *Adams + Bush*
ATTORNEYS

June 3, 1958 L. J. WHITE 2,837,182
KEYLESS LOCKING AND OPERATING SYSTEMS FOR CELL DOORS
Original Filed April 3, 1953 9 Sheets-Sheet 3
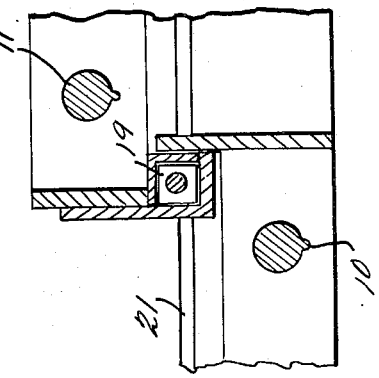
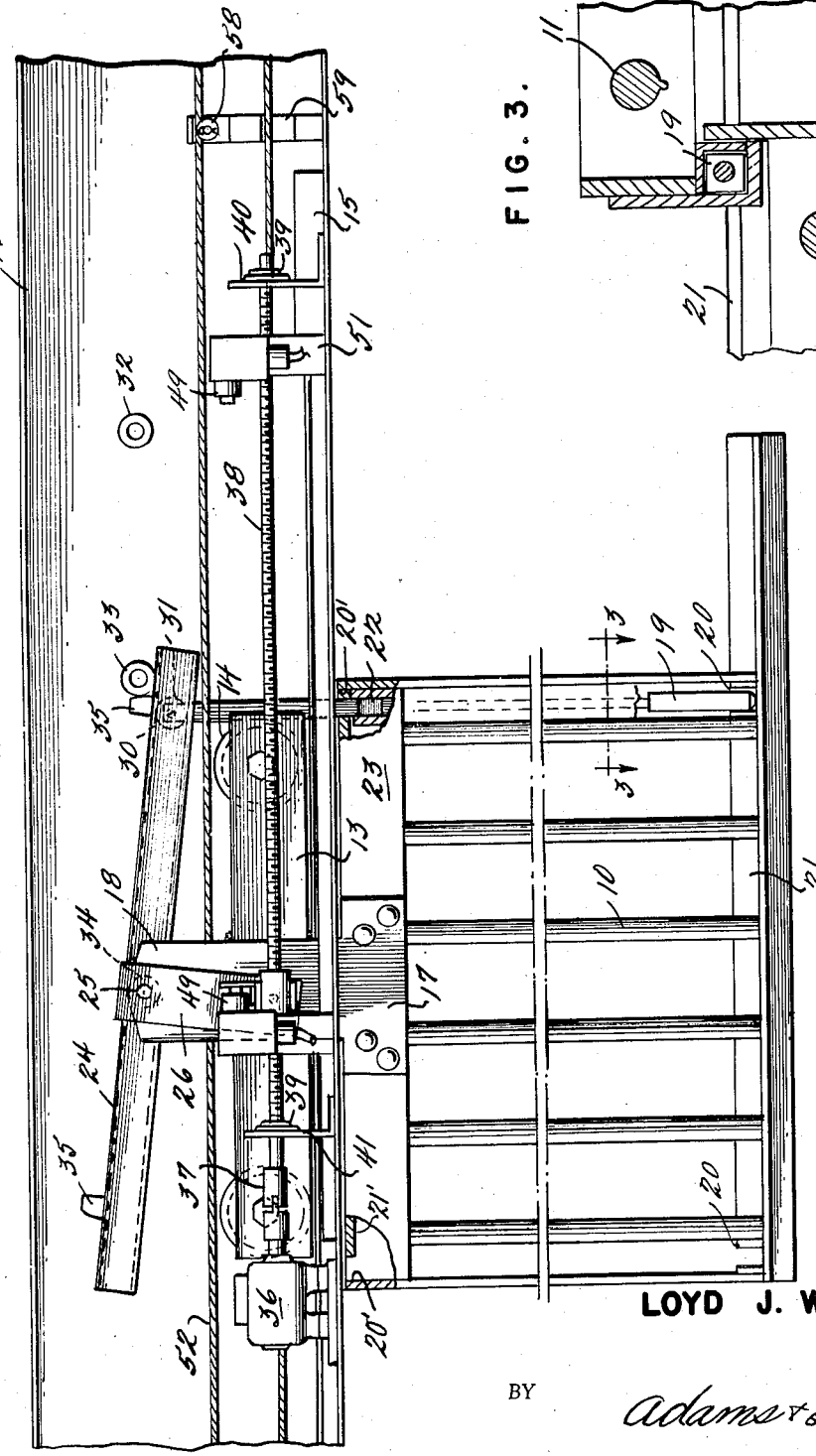
INVENTOR
LOYD J. WHITE
BY *Adams & Bush*
ATTORNEYS

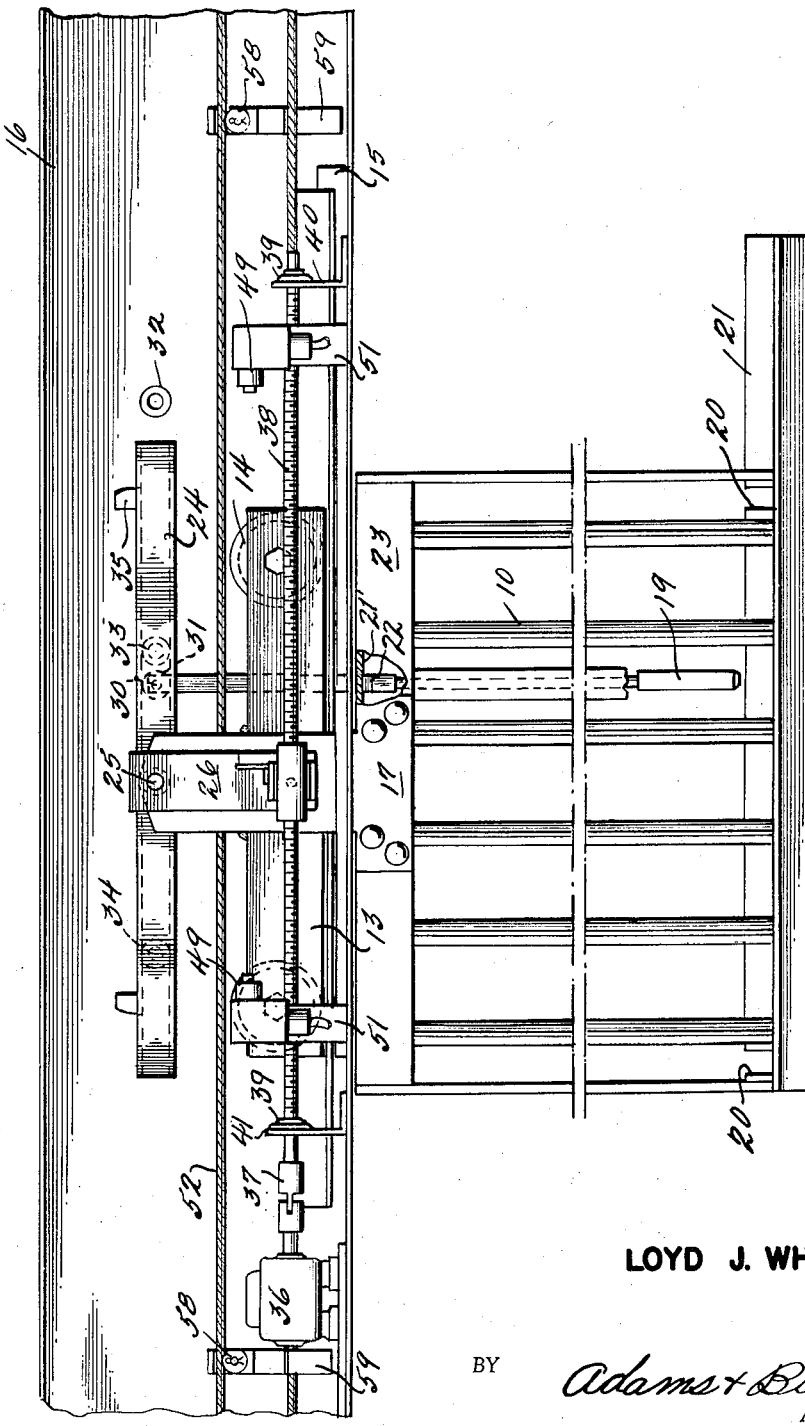

June 3, 1958 L. J. WHITE 2,837,182
KEYLESS LOCKING AND OPERATING SYSTEMS FOR CELL DOORS
Original Filed April 3, 1953 9 Sheets-Sheet 5

INVENTOR
LOYD J. WHITE
BY Adams + Bush
ATTORNEYS

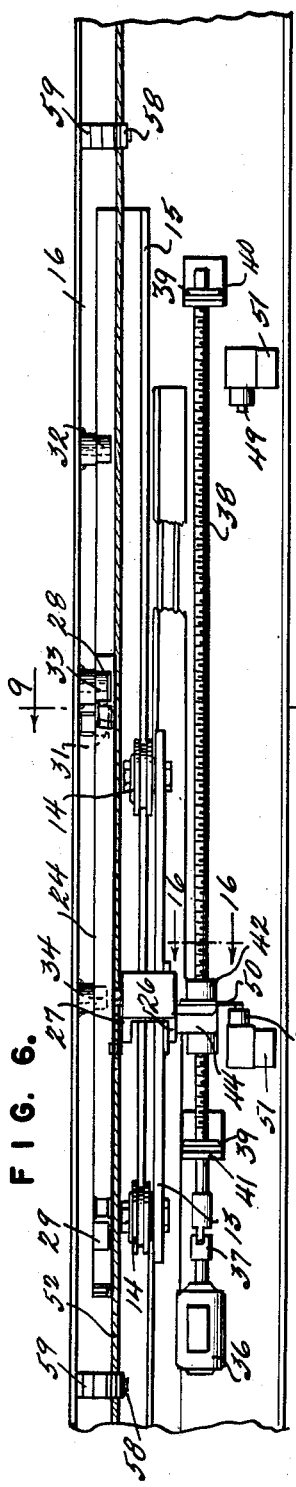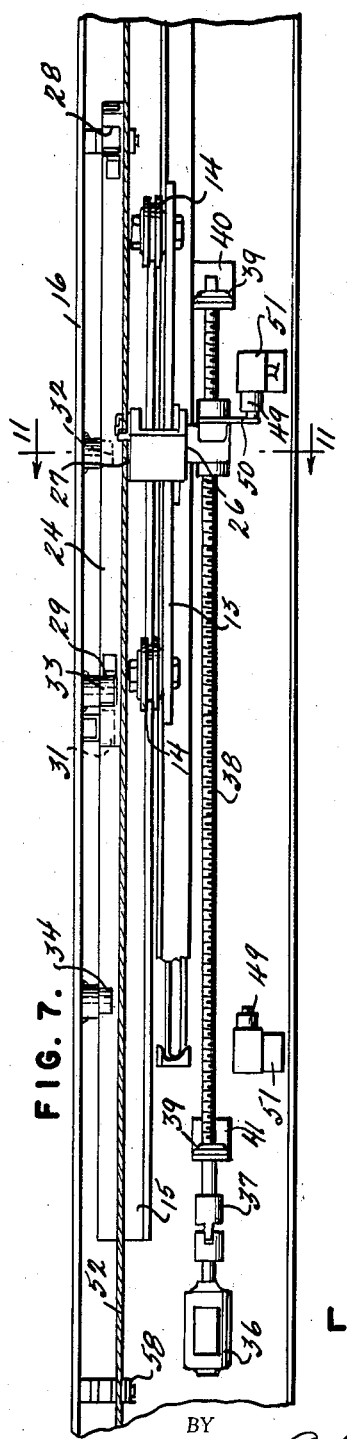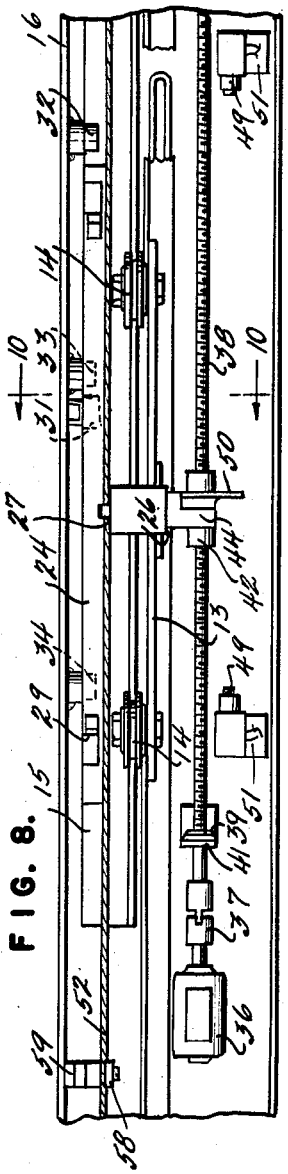

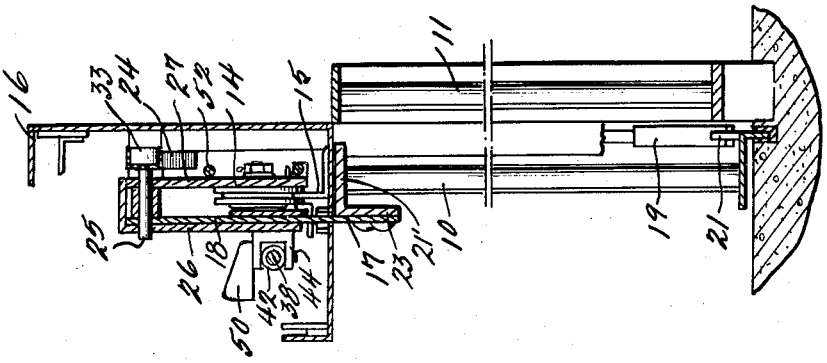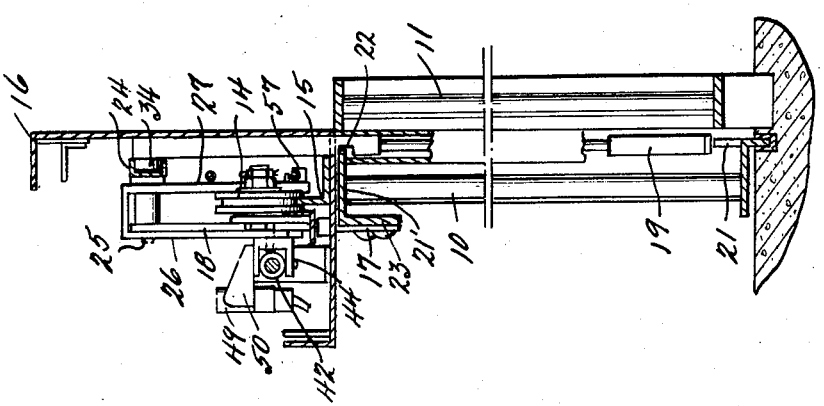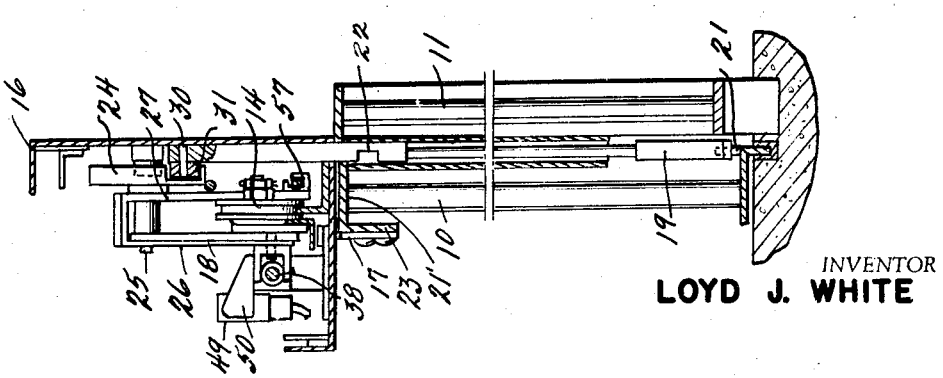

June 3, 1958 L. J. WHITE 2,837,182
KEYLESS LOCKING AND OPERATING SYSTEMS FOR CELL DOORS
Original Filed April 3, 1953 9 Sheets-Sheet 8
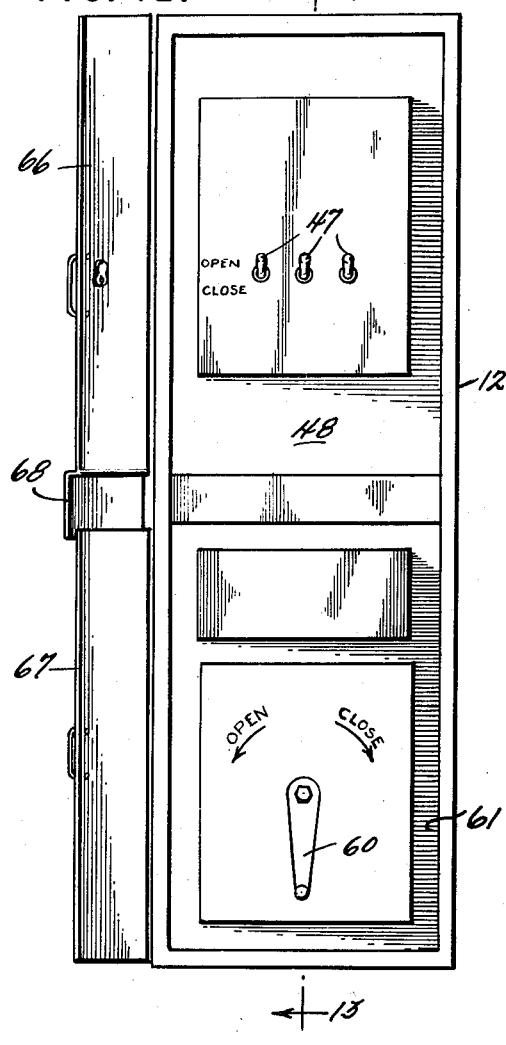
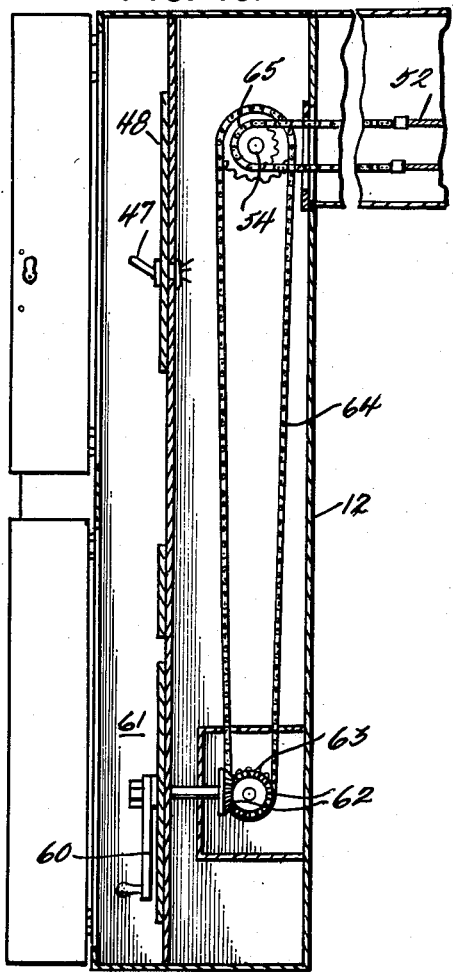
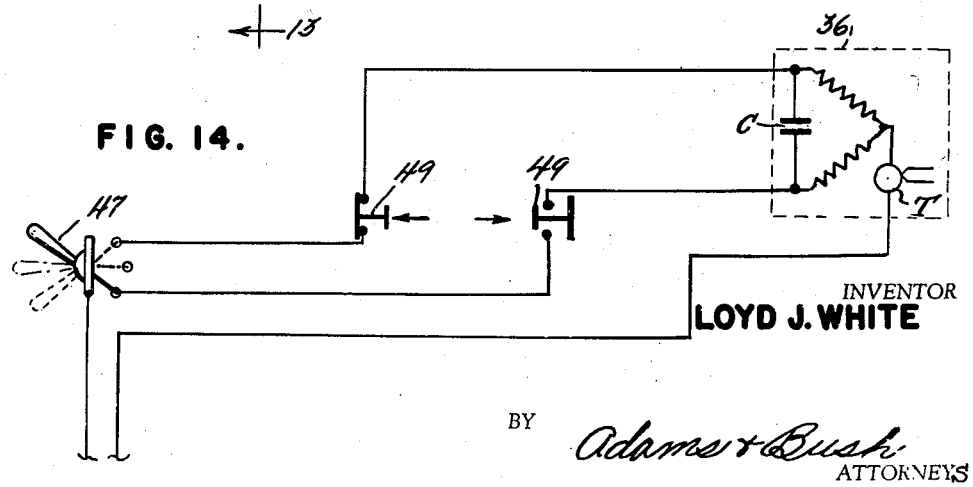
INVENTOR
LOYD J. WHITE
BY Adams + Bush
ATTORNEYS

INVENTOR
LOYD J. WHITE

United States Patent Office 2,837,182
Patented June 3, 1958

2,837,182

KEYLESS LOCKING AND OPERATING SYSTEMS FOR CELL DOORS

Loyd J. White, San Antonio, Tex., assignor to Southern Steel Company, San Antonio, Tex., a corporation of Texas Continuation of application Serial No. 346,581, April 3, 1953. This application August 12, 1957, Serial No. 678,266

6 Claims. (Cl. 189—7)

This invention relates to keyless locking and operating systems for a plurality of sliding cell doors arranged in a row or series and, among other objects, aims to provide greatly improved and simplified mechanism employing individual motors for actuating the locks and doors and associated manually operable means readily accessible for temporary use in an emergency, arising from power failure or other causes.

Another object of the invention is to provide a locking and operating system of the type set forth, wherein the emergency operating mechanism can be employed to actuate the keyless locks and operate all of the doors in a series or bank of cells in case of fire and power failure, without the necessity of first disconnecting the power actuators from all of the doors. The idea is to enable a guard to operate, lock or unlock, all of the doors manually from a master control cabinet adjacent to the motor control switches.

Still another object of the invention is to provide a locking and operating system for cell doors employing small, individual, reversible electric motors with ball bearing screw and nut actuators connected to the doors, so that all of the doors may be operated by the emergency, manual operating means upon a power failure, even though some of the doors may be partially opened or locked open while the other doors may be locked closed. The idea is to provide manual, emergency operating means which is readily accessible to enable a guard to open all closed and locked doors to permit the escape of all prisoners in case of a fire and, thereafter, to operate all of the doors simultaneously until the power is restored.

A further object of the invention is to provide greatly improved emergency, manual operating means employing a flexible cable adapted to engage and operate all of the locks and doors in a series or bank of cells by imparting movements through the operating mechanism which is connected to the individual motor actuators.

Other aims and advantages of the invention will appear in the following specification, when considered in connection with the accompanying drawings, wherein:

Fig. 2 is a fragmentary side elevation showing a single cell door locked in closed position;

Fig. 3 is a sectional view, taken on the line 3—3 of Fig. 2;

Fig. 4 is a vertical elevation, similar to Fig. 2, showing a cell door in transit;

Figs. 6, 7 and 8 are fragmentary plan views of the door operating mechanism, showing the relative positions of the operating mechanism with the doors locked closed, locked open, and in transit, respectively;

Fig. 9 is a sectional view taken on the line 9—9 of Fig. 6;

Fig. 10 is a sectional view taken on the line 10—10 of Fig. 8;

Fig. 11 is a sectional view taken on the line 11—11 of Fig. 7;

Fig. 12 is an elevation showing a control cabinet with its doors open;

Fig. 13 is a fragmentary vertical sectional view on the line 13—13 of Fig. 12;

Fig. 14 is a simplified wiring diagram showing a motor control circuit;

This application is a continuation of my co-pending application, Ser. No. 346,581, filed April 3, 1953, now abandoned, for Keyless Locking and Operating System for Cell Doors.

Figure 1:
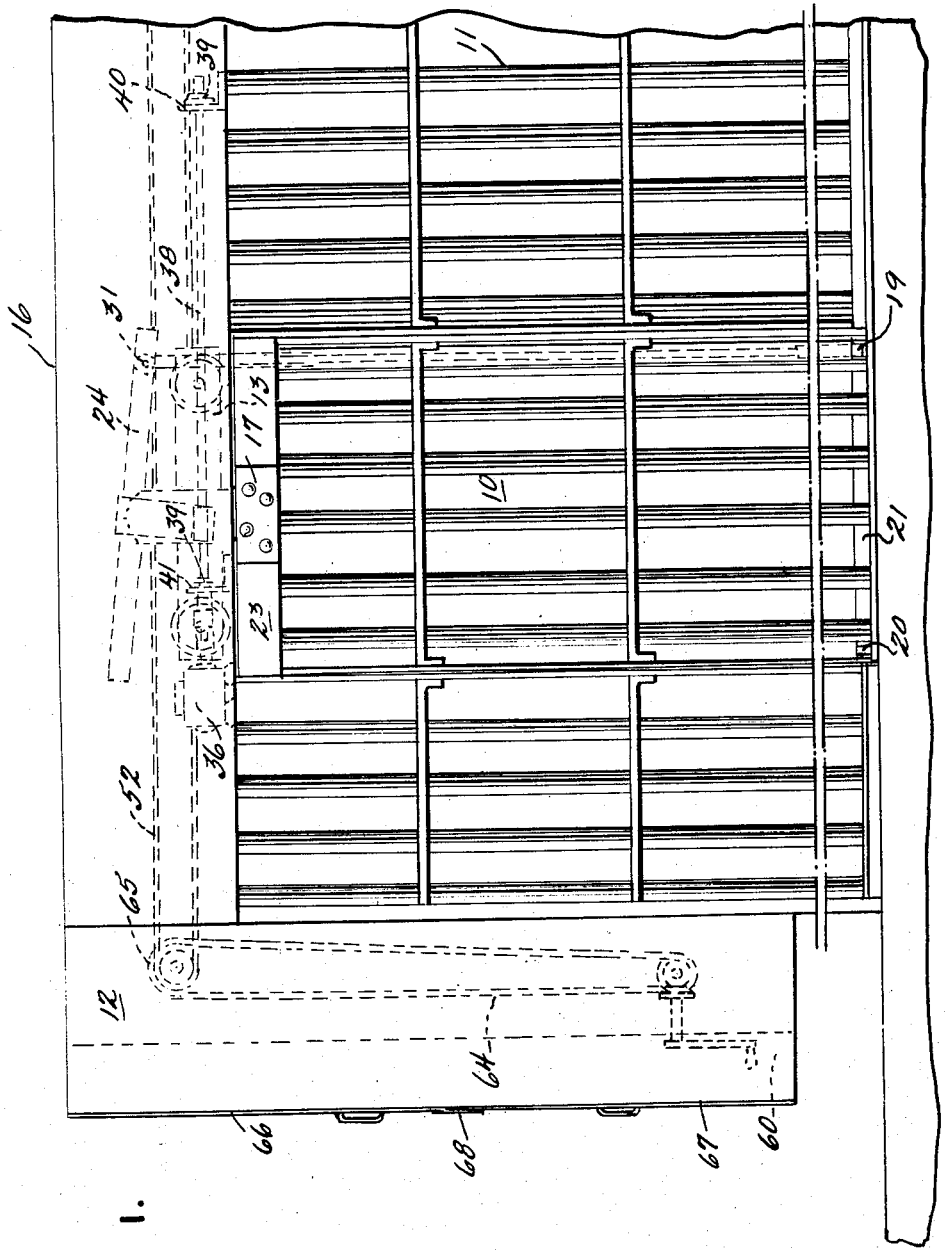
Fig. 1–1a is a vertical elevation showing one embodiment of the invention applied to a plurality of sliding cell doors.
Figure 1A:
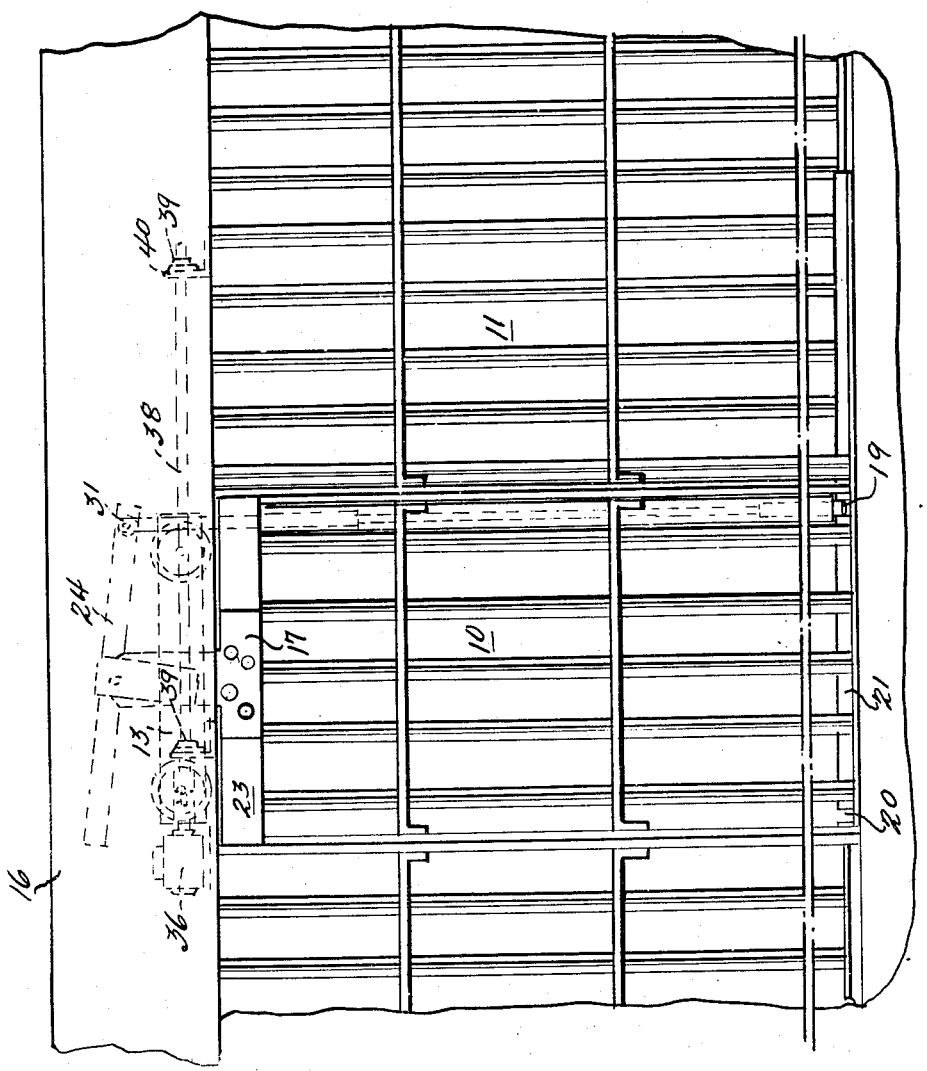
Figure 5:
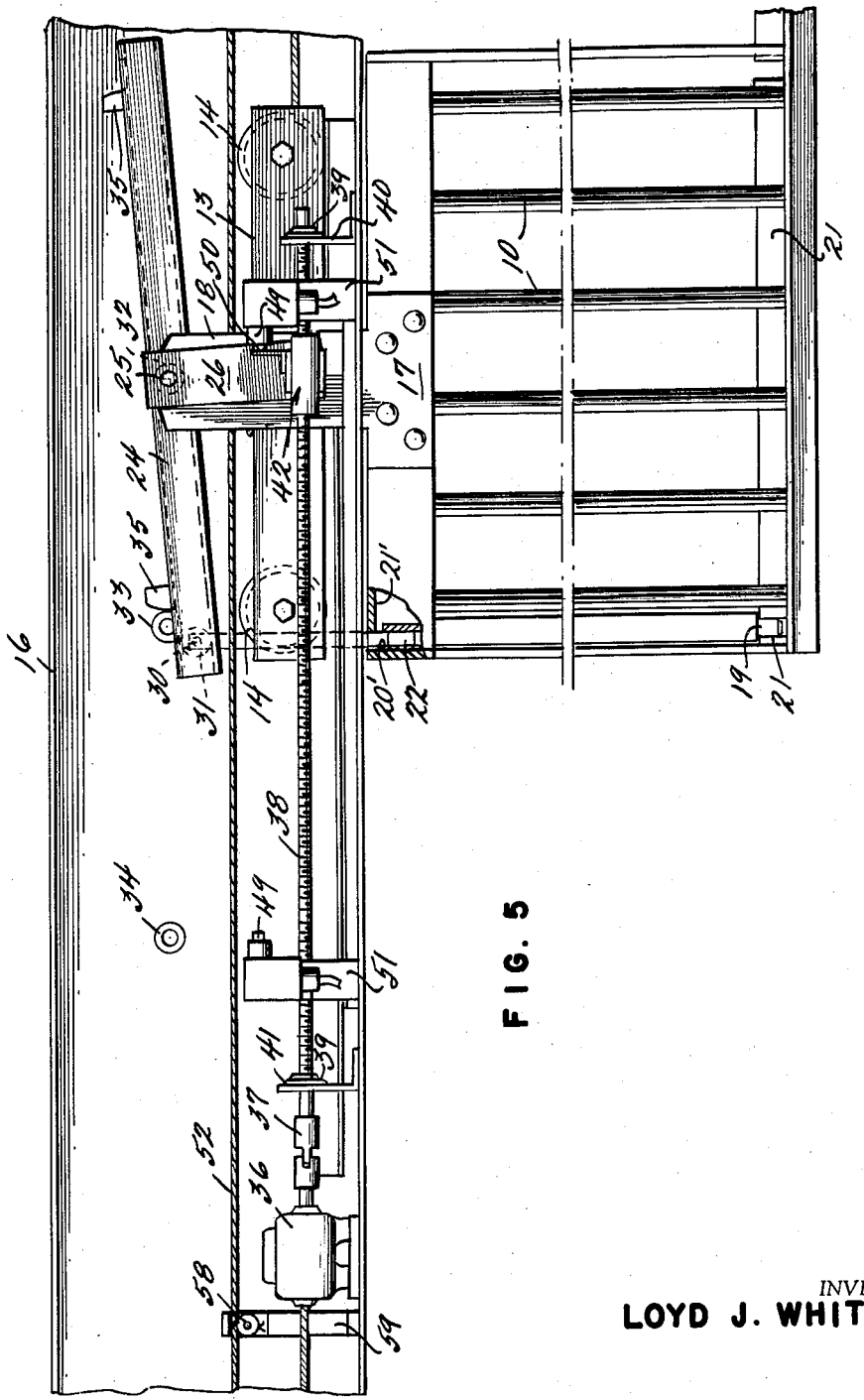
Fig. 5 is an elevation, similar to Fig. 2, showing the door locked open.

Referring more particularly to the drawings, the preferred embodiment of the invention is illustrated as being applied to prison cells, wherein a plurality of sliding cell doors are arranged in a row or series of cells, as is customary in prison installations. All of the doors are adapted to be controlled or operated from a remote control cabinet, as is well known in the art. For the sake of simplicity, two such cell doors 10 in a row or series of cells 11, are shown in Fig. 1–1a, and they are adapted to be operated by controls arranged in a control cabinet 12 at one end of the row or series of cells. Each door is shown as being suspended from the usual door carriage 13 having rollers 14 guided on a track 15 within a cover box 16 extending longitudinally above the row of cells. A hanger plate 17 is connected to the door and extends through a longitudinal slot in the bottom wall of the cover box to permit the door to slide back and forth from open to closed position. This hanger is shown as being in the form of a T-shaped plate with an upstanding projection 18 welded or otherwise secured to the frame of the door carriage.

As shown in Figs. 2, 3, 4 and 5, each door is adapted to be locked in open or closed position by a vertical locking bolt or bar 19 arranged in a casing or housing at the back jamb of each door. The locking bar cooperates with laterally spaced notches 20 formed in an upstanding locking flange 21 carried by the bottom frame of the door to lock the door at its bottom. The locking bar is also shown as having a square portion at its upper end which cooperates with laterally spaced notches 20' formed in a horizontal locking flange 21' forming part of the upper frame member of the door to lock the door at its top. The locking bar is provided with a notch 22 positioned to straddle the horizontal locking flange 21' of the upper frame 23 of the door when the bar is raised to unlocking position, this permits the door to be moved from one position to the other (see Figs. 9, 10 and 11). The construction and arrangement is such that, when the door is fully closed or fully opened, the vertical locking bar will be lowered into one or the other of the notches 20 in the bottom door frame and lock the door at the top and bottom in its closed or opened position. The construction of the doors, carriages and locks is preferably the same as that shown in the patent to Hart et al., No. 2,262,674.

In accordance with this invention, the locking bars and doors are adapted to be operated by individual motors and emergency operating mechanism, both operatively connected to the respective door carriages. For this purpose, a lock and door operating member, shown as being in the form of a rocker member 24, is pivotally connected to the upper end of the projection 18 of the hanger plate 17 by means of a pivot pin or bolt 25 (Fig. 11) passing through depending front and rear plates 26 and 27 which act as operating arms for the rocker member and are welded or otherwise secured to the rocker member. The rocker member is shown as being in the form of a structural channel opening toward the rear of the cover box and it has vertical notches 28 and 29 in the upper flange near the opposite ends for a purpose to be hereinafter described. The locking bar 19 projects upwardly through the bottom of the cover box behind the rocker channel 24 and has a forwardly projecting pivot pin 30 carrying a roller 31 engaged in and guided by the channel (Fig. 9), so that when the channel is rocked it will raise or lower the locking bar. The depending plates or rocker arms 26 and 27 are U-shaped and straddle the hanger extension 18 and the carriage frame, all as shown in the aforesaid patent to Hart et al.

Referring to Fig. 2, which shows the door in its closed and locked position, it is necessary, first, to raise the locking bar 19 to unlock the door and, then, to impart propelling movement to the door. For this purpose, the channel-shaped rocker 24 is first raised to a horizontal position and confined to move horizontally toward door opening position by spaced, horizontally aligned rollers 32, 33 and 34 mounted on pivot pins connected to the back wall of the cover box and adapted to engage the channel. In the position shown in Fig. 2, the left hand roller 34 is coaxial with the pivot pin 25, so that the rocker is free to swing counterclockwise and raise the locking bar. The roller 33 is above the slot 28 in the upper flange at the right hand end of the rocker channel and, when the rocker is swung to its horizontal position, the guide roller disappears through the slot and is confined in the channel against its bottom flange. Thus, the rocker will remain in its horizontal position with the guide roller 33 immediately behind the roller 31 on the upper end of the locking bar 19. The roller is guided into the notch 28 by means of an upstanding lug 35 on the upper flange of the rocker channel and a similar lug is provided at the opposite end of the rocker channel adjacent to the slot 29 for the same purpose. The rocker is confined to move horizontally to the right when it is swung into its horizontal position by the two rollers 33 and 34, thus imparting opening movement to the door. As the door moves toward its fully open position, the right hand open end of the rocker channel member 24 engages the right hand roller 32, as will be apparent by reference to Fig. 4, and the rocker channel member 24 will be confined to travel horizontally and will be guided on all of the rollers 32, 33 and 34. When the door is fully opened or reaches the position shown in Fig. 5, the middle guide roller 33 will register with the slot 29 in the left hand end of the channel member; while the right hand roller 32 will be coaxial with the pivot pin 25, in which position the rocker arm is free to swing counterclockwise and positively force the locking bolt to move downwardly to its locking position in engagement with the left hand notch 20 in the bottom frame of the door, with the middle guide roller 33 extended above the slot 29, as clearly shown in Fig. 5. This operation is clearly explained in the aforesaid patent to Hart et al.

Figure 16:
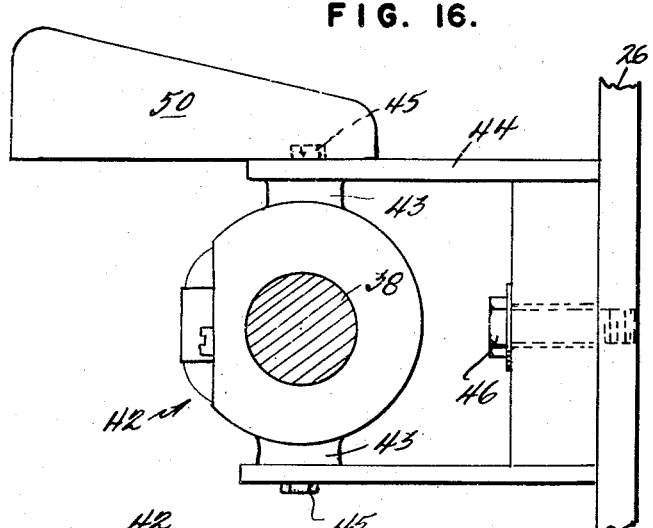
Fig. 16 is a fragmentary sectional view on the line 16—16 of Fig. 6.
Figure 18:
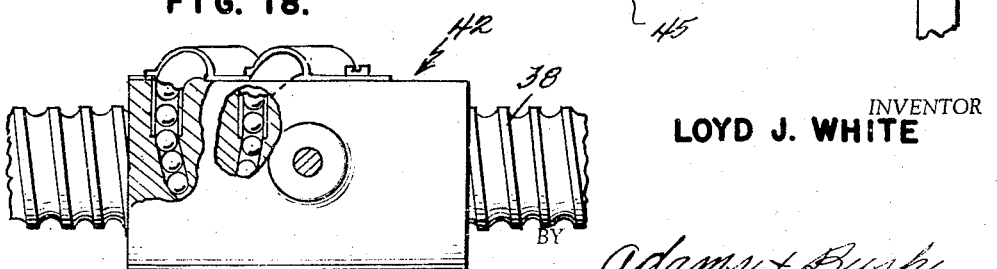
Fig. 18 is a fragmentary view, partly in section, of the ball bearing screw and nut actuator shown in Fig. 16.

In accordance with this invention, each of the doors is operated by an individual, reversible electric motor 36 mounted on the bottom wall of the cover box and having an armature shaft coupled by a universal coupling member 37 to a screw shaft 38 mounted in self-aligning antifriction bearings 39 carried by upstanding brackets 40 and 41, likewise secured to the bottom wall of the cover box. The screw 38 carries a ball-bearing nut 42 of a well known type, which may be similar to the one shown in U. S. Patent No. 2,380,662. The nut is shown, in Fig. 16, as having opposed bosses 43 to which a yoke member 44 is pivotally connected by pivot bolts 45. The yoke is loosely and pivotally connected by a bolt 46 to the front plate or arm 26 which operates the rocker 24. The loose connection permits limited rocking movement of the arm 26 without binding. The arrangement is such that the motor 36 operates the screw to impart actuating movement through the ballbearing nut 42 to the rocker member to operate the lock and propel the door either from its locked closed position to its locked open position, or from its locked open position to its locked closed position. The ball bearing nut on the screw actuator enables the door to be moved independently of the motor, so that the nut will rotate the screw and the armature of the motor. In other words, the door can be operated manually without disconnecting the screw actuator from the rocker member.

Referring to the wiring diagram shown in Fig. 14, each motor 36 is shown as being of the capacitor type, wherein a condenser C is connected across the field windings, so that the motor will not be stalled due to the starting torque required to move the doors. Each of the motors also has a thermostatic cutout T to prevent it from being burned out when the motor is stalled for any reason. This could happen when a door is jammed or held by a prisoner.

Referring to Figs. 12, 13 and 14, the motors are adapted to be controlled by toggle switches 47 arranged in a panel 48 in the upper portion of the control cabinet 12. The switches are adapted to be moved to three positions, as shown in Fig. 14. In the upper position, the motor is energized to operate the lock and propel the door to its open position. In the horizontal position of the switch lever, the current is cut off and, in the lower position, the motor is reversed to unlock the door and move it to its closed position and lock it closed.

Limit switches 49 of the spring plunger type are arranged in the motor circuit to stop the motor when the door reaches the limit of its movement either in open or closed position. For that purpose the yoke 44 is shown, in Fig. 16, as carrying a switch actuating arm 50 adapted to engage the plungers of the limit switches 49. The limit switches are shown as being mounted on brackets 51 suitably secured to the bottom wall of the cover box. The arrangement is such that the limit switches will automatically break the circuits to the motor and stop it immediately when the door reaches its fully open or fully closed and locked position. The motor has a very small armature and will stop quickly while the screw actuator is swinging the rocker arm to its final locking position, either in a clockwise or counterclockwise direction.

It will be understood that, when the door is locked open, the right hand limit switch 49 will be held in open position against the tension of its spring; while the left hand limit switch 49 remains in its circuit closing position, as shown in Fig. 14. Thus, when the toggle switch 47 is moved to its lower position, it will close the circuit through the left hand limit switch 49 and operate the motor to unlock the door and move it to its closed and locked position. As soon as the door is again unlocked and moved away from its closed position toward open position, the left hand limit switch 49 will close automatically and remain closed until the door is again operated and moved to its locked closed position, as explained above. In the arrangement shown, a guard may operate the toggle switches quickly and in succession to operate all of the doors without employing a master switch for that purpose. This will avoid imposing a heavy starting load upon the circuit to the motors. He can leave the switch arms in their operative positions to indicate the condition of all the doors, when they are normally operated by the electric motors. For example, if all of the switch levers are left in their upper positions, as shown in Fig. 13, the guard will know that all of the doors, whose motors are controlled by those switches, are open and locked open. If the switch levers are left in their lower positions, he will know that the corresponding doors are closed and locked closed. Then, he will know how to operate the switches to open or close the doors. Of course, suitable electrical indicators, such as small lamps in the motor circuits, can be employed to indicate the actual positions of the doors. However, such indicators form no part of the present invention.

Figure 15:
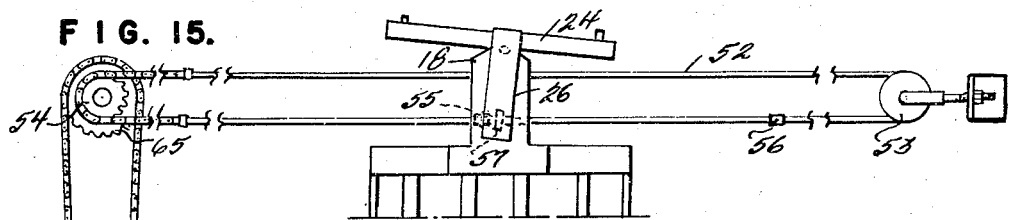
Fig. 15 is a skeleton view of the emergency manual operating mechanism.
Figure 17:
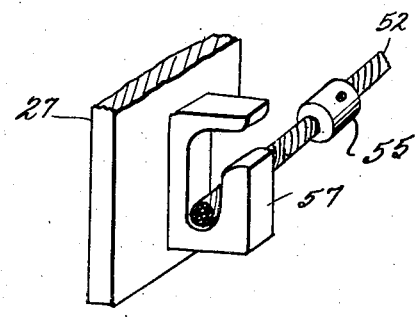
Fig. 17 is a perspective view showing a notched bracket on a rear arm of the rocker member.

In case of an emergency, it is important that the guard shall be able to unlock and open all locked doors to permit the escape of prisoners who are locked in their cells. This is especially desirable in case of fire. It is also desirable that the guard shall be able to operate all of the doors simultaneously when the power fails for any reason. For this purpose, the rocker members connected to the door hangers are likewise arranged to be operated by a master mechanical means arranged to be actuated at the control cabinet 12. An endless wire cable 52 is shown as extending behind the door carriages and the back plates 27 which are connected to the rockers, and it is trained over an adjustable pulley or sheave 53 located at the rear end of the cover box. It has a sprocket chain insert at the forward end which engages a sprocket 54 (Fig. 15). Adjustable stop members 55 and 56 are secured by set screws to the bottom run of the cable which passes through notched brackets 57, welded or otherwise secured to the back plates or rocker arms 27, as clearly shown in Fig. 17. The upper arm of the cable is shown as being guided by grooved rollers 58 carried by brackets 59 secured to the back wall of the cover box. The endless cable is adapted to be actuated by a hand crank 60 arranged in a bottom compartment 61 of the control cabinet 12. The crank is shown as being connected through beveled gears 62 to operate a sprocket 63 carrying a sprocket chain 64 trained over a sprocket 65 on the horizontal shaft which carries the cable operating sprocket 54.

The spaced stop members 55 and 56 are so arranged that they will actuate the rocker members 24 on all of the doors in unison by engaging the notched brackets 57 on the back plates or arms 27 of the rocker members. In the position shown in Fig. 15, it will be noted that the bottom run of the cable is ready to be moved toward the right with the left hand stop member 55 engaging the notched bracket 57, to unlock and move the door to its open position. To unlock the opened door and move it toward its closed position, it is only necessary to turn the crank 60 until the right hand stop member 56 engages the bracket 57 on the back plate 27 to reverse the movements and return the door to its locked closed position.

The control cabinet is shown as having separate hinged doors 66 and 67 which are adapted to be locked closed with a key or keys (not shown) carried by a guard. The upper door is shown as having a lower flange 68 which overlaps the upper edge portion of the lower door 67, so that the manual operating mechanism is not accessible until after the upper door is opened and it is determined that there is a power failure. Then the guard may open the lower door 67 and have full access to the hand crank 60.

In the practical application of the improved system, the electric motors are quite small, ¼ horse power or less, and their speed is such as to open or close the doors in about five seconds. They impose a pressure of only seventy-five to one hundred pounds on the doors, so that they will not seriously injure a prisoner who tries to block them. The system can be applied to a group of cell doors which are not in alignment. Moreover, the control switches for several rows or series of prison cells may be located in a single control cabinet and, if desired, a duplicate set of the switches may be provided in a warden's office, where they will be readily accessible in case of a mutiny.

Obviously, the invention is not restricted to the particular embodiment thereof herein shown and described but is capable of many changes within the scope of the appended claims.

What is claimed is:

1. A system for keyless and remote control operation of a series of sliding cell doors to automatically and selectively lock and unlock and impart closing and opening movement to each cell door individually, comprising a unitary power operated mechanism for each door including a screw shaft positioned above and extending across the door opening; a ball bearing nut mounted on said shaft for linear travel thereon when said shaft is rotated; a reversible electric motor directly coupled to said shaft for rotating it in either direction; a remote control switch for the motor; a vertically movable locking bar for locking the door in its open and closed positions; a rocker member pivotally mounted on the door carriage for rocking movement about a horizontal axis perpendicular to the plane of the door, said rocker member being slidably connected to operate said locking bar and having a depending operating arm fixedly connected thereto; an actuating member pivotally connected to said nut for oscillation about a vertical axis and to said operating arm for loose oscillation about a horizontal axis; and limit switches at opposite ends of the door opening connected to stop said motor after the door has reached either one of its locked positions, the construction and arrangement being such that when said remote control switch is operated to cause said motor to rotate said screw shaft in one direction said nut will be caused to travel longitudinally along said screw shaft and actuate said rocker member about its pivot to unlock said locking bar, said door will be propelled from its locked open position to its locked closed position and said rocker member will be actuated about its pivot to lock said locking bar, and when said remote control switch is operated to cause said motor to rotate said screw shaft in the opposite direction said nut will be caused to travel longitudinally along said screw shaft and actuate said rocker member about its pivot to unlock said locking bar, said door will be propelled from its locked closed position to its locked open position and said rocker member will be actuated about its pivot to lock said locking bar.

2. Apparatus as set forth in claim 1, wherein remotely controlled emergency manually operable means for simultaneously and collectively operating all of the doors are provided, said manually operable means including an endless flexible cable carrying stop members positioned to engage the rocker members on the doors and impart operating movement to the locking bars and doors, the ball bearing nuts permitting manual operation without disconnecting the motors.

3. A system for keyless and remote control operation of a series of sliding cell doors to automatically and selectively lock and unlock and impart closing and opening movement to each cell door individually, comprising a unitary power operated mechanism for each door including a screw shaft positioned above and extending across the door opening; a ball bearing nut mounted on said shaft for linear travel thereon when said shaft is rotated; a reversible electric motor directly coupled to said shaft for rotating it in either direction; a remote control switch for the motor; a vertically movable locking bar for locking the door in its open and closed positions; a rocker member pivotally mounted on the door carriage for rocking movement about a horizontal axis perpendicular to the plane of the door, said rocker member being slidably connected to operate said locking bar and having a depending operating arm fixedly connected thereto; an actuating member pivotally connected to said nut and to said arm; and limit switches at opposite ends of the door opening connected to stop said motor after the door has reached either one of its locked positions, the construction and arrangement being such that when said remote control switch is operated to cause said motor to rotate said screw shaft in one direction said nut will be caused to travel longitudinally along said screw shaft and actuate said rocker member about its pivot to unlock said locking bar, said door will be propelled from its locked open position to its locked closed position and said rocker member will be actuated about its pivot to lock said locking bar, and when said remote control switch is operated to cause said motor to rotate the screw shaft in the opposite direction said nut will be caused to travel longitudinally along said screw shaft and actuate said rocker member about its pivot to unlock said locking bar, said door will be propelled from its locked closed position to its locked open position and said rocker member will be actuated about its pivot to lock said locking bar.

4. Apparatus as set forth in claim 3, wherein the remote control switches for the motor are located at a master control station at one end of the series of cells; and wherein remotely controlled emergency manually operable means for simultaneously and collectively operating all of the doors are provided, said manually operable means including an endless flexible cable carrying stop members positioned to engage the rocker members on the doors and impart operating movement to the locking bar and doors; and a hand crank for operating said endless flexible cable located at said master control station adjacent said remote control switches, the ball bearing nuts permitting manual operation without disconnecting the motors.

5. In a keyless system for locking and operating a series of sliding cell doors to automatically and selectively lock and unlock and impart closing and opening movement to each cell door individually, of the type wherein each cell door is provided with a vertically movable locking bar positioned to engage the door and lock it in its opened and closed positions and an operating member mounted on top of the door for movement therewith and slidably engaging its locking bar for moving the locking bar to its unlocked and locked positions, the improvement which comprises a unitary power operated mechanism for each door including a screw shaft positioned above and extending across the door opening, a ball bearing nut mounted on said screw shaft for linear travel thereon when said shaft is rotated; a reversible electric motor coupled to said shaft for rotating it in either direction; a remote control switch for the motor and an actuating member mounted on said ball bearing nut and connected to the operating member mounted on the cell door for imparting movement thereto; and limit switches at opposite ends of the door opening connected to stop said motor after the door has reached either one of its locked position, the construction and arrangement being such that when said remote control switch is operated to cause said motor to rotate said screw shaft in one direction said nut will be caused to travel longitudinally along said screw shaft and actuate said operating member to unlock said locking bar, said door will be propelled from its locked open position to its locked closed position and said operating member will lock said locking bar, and when said remote control switch is operated to cause said motor to rotate said screw shaft in the opposite direction said nut will be caused to travel longitudinally along said screw shaft and actuate said operating member to unlock said locking bar, said door will be propelled from its locked closed position to its locked open position and said operating member will lock said locking bar.

6. Apparatus as set forth in claim 5, wherein the remote control switches for the motor are located at a master control station at one end of the series of cells; and wherein remotely controlled emergency manually operable means for simultaneously and collectively operating all of the doors are provided, said manually operable means including an endless flexible cable carrying stop members positioned to engage the rocker members on the doors and impart operating movement to the locking bar and doors; and a hand crank for operating said endless flexible cable located at said master control station adjacent said remote control switches, the ball bearing nuts permitting manual operation without disconnecting the motors.

References Cited in the file of this patent

UNITED STATES PATENTS

| | | |
|---|---|---|
| 635,602 | Shoenfeld | Oct. 24, 1899 |
| 2,262,674 | Hart et al. | Nov. 11, 1941 |
| 2,444,886 | Vickers | July 6, 1948 |

FOREIGN PATENTS

| | | |
|---|---|---|
| 104,079 | Australia | May 25, 1938 |